United States Patent [19]

Csapo

[11] 4,256,453
[45] Mar. 17, 1981

[54] CALCINER SCREW CONSTRUCTION

[75] Inventor: Michael A. Csapo, Wyncote, Pa.

[73] Assignee: Selas Corporation of America, Dresher, Pa.

[21] Appl. No.: 951,384

[22] Filed: Oct. 16, 1978

[51] Int. Cl.³ .............................................. F27D 3/00
[52] U.S. Cl. .................................. 432/235; 198/672; 432/239
[58] Field of Search ............... 198/672, 673; 432/235, 432/236, 239, 246; 202/118; 110/110; 414/190

[56] References Cited

U.S. PATENT DOCUMENTS

| | | | |
|---|---|---|---|
| 1,415,061 | 5/1922 | Smith et al. | 202/118 |
| 1,783,190 | 12/1930 | Hertel | 202/118 |
| 1,923,772 | 8/1933 | Carpenter | 432/246 |
| 1,993,688 | 3/1935 | Specketer et al. | 432/235 |
| 2,025,547 | 12/1935 | Ornitz | 432/246 |
| 2,098,999 | 11/1937 | Brown | 432/103 |
| 3,976,423 | 8/1976 | Schmidt | 432/246 |

FOREIGN PATENT DOCUMENTS 839435  6/1960  United Kingdom ................. 432/246

*Primary Examiner*—John J. Camby
*Attorney, Agent, or Firm*—Miller & Prestia

[57] ABSTRACT

In a calciner of the type having a screw conveyor for advancing material to and through a calcining reaction zone, and wherein the screw conveyor comprises an internally cooled support shaft which is provided within an outer screw flight shaft, an improvement comprising means for controlling the bending stress between the inner and outer shafts is provided. Further, means are also provided for allowing axial movement of one of the shafts relative to the other. The bending stress ranges between the inner and outer shafts are controlled by means of a plurality of bearing members which extend in a generally radial direction with respect to the shafts and which extend between the shafts. The bending stress range is also controlled by the axial position of the bearing members along the shafts. Axial movement of one shaft relative to the other is permitted by the provision of bearing cages around the inner shaft with axial slots formed in the cage. A portion of the bearing member is tracked in the slot and can thus slide axially therein.

21 Claims, 6 Drawing Figures

U.S. Patent  Mar. 17, 1981  Sheet 2 of 3  4,256,453
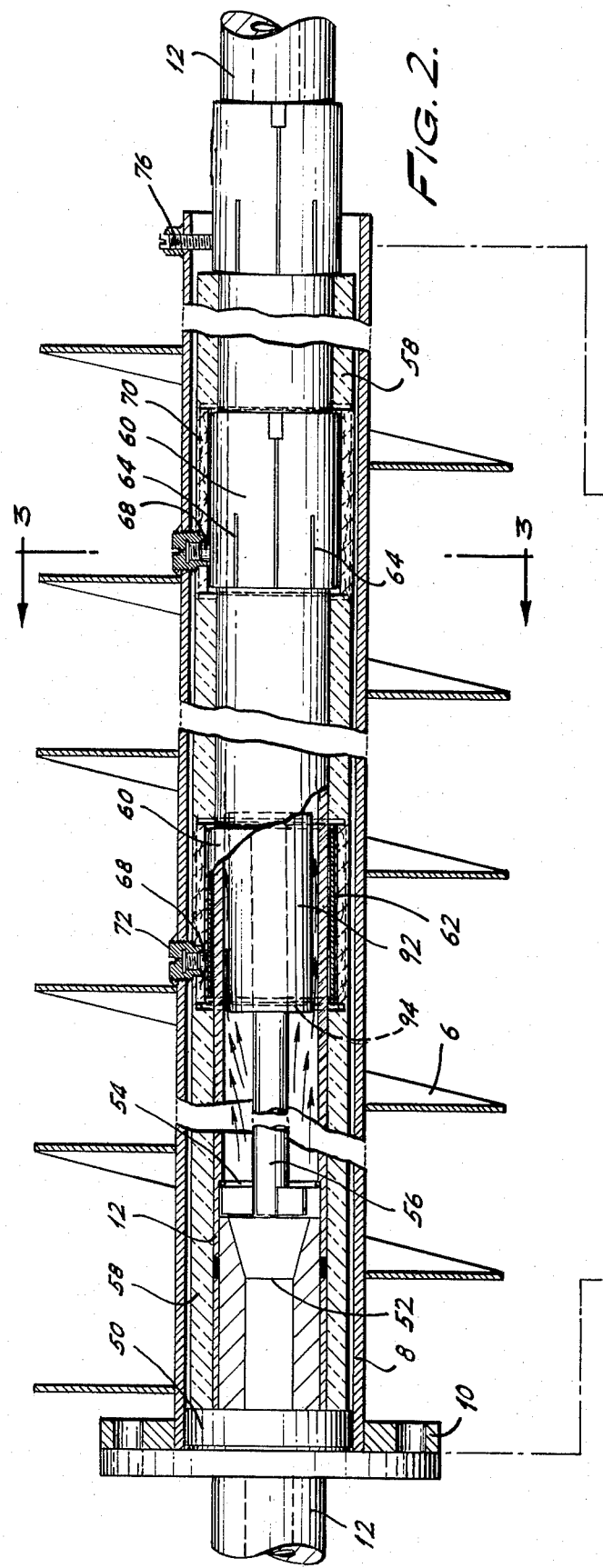
FIG. 2.
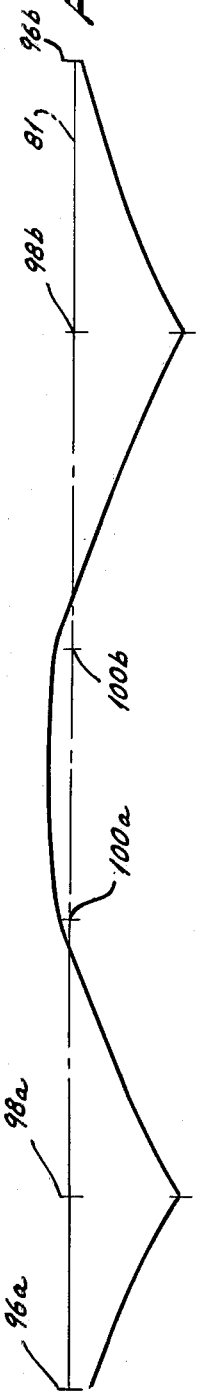
FIG. 5.
FIG. 6.

CALCINER SCREW CONSTRUCTION

This invention relates to a calciner for particulate material and more particularly it relates to a calciner having a novel screw construction which permits efficient high temperature calciner operation with maximum efficiency and economy.

PRIOR ART

Calciners have been produced in the past, having a multiplicity of screws arranged longitudinally in a calcining chamber. Because of inherent strengths of structural materials used in the screws, severe temperature limitations have been imposed upon the apparatus. Particularly in cases where the screw has a considerable length, high stresses are built up which severely limit the temperature range and effectiveness of the screw. Although efforts have been made to minimize or to distribute the stresses along the length of the screw, it has been extremely difficult to attain the high temperatures that are desired in a calcining operation.

In an endeavor to improve the temperature capabilities of the calcining chamber, means have heretofore been provided for cooling the screw internally. Although this has resulted in a maintenance of acceptable physical properties in the materials of which the screw is made, serious temperature limitations as to calcining temperature of the particulate material remains. Further, an excessively high rate of heat transfer from the calcining chamber through the screw to the cooling medium has resulted in serious heat losses in the operation of the calciner.

One means for providing internal cooling of a furnace shaft is shown in U.S. Pat. No. 3,006,625 (Boron). In the disclosed device, an inner shaft is concentrically disposed within an outer shaft which outer shaft is directly exposed to the high temperatures existing within the furnace. The inner shaft is preferably water cooled. A camming sleeve is disposed about the inner shaft and cooperates with force transmitting devices formed on the inside portion of the outer shaft so that the outer shaft is continuously supported by the inner shaft regardless of the expansion or contraction of the diameter of the outer shaft.

Specific examples of internally cooled screw conveyors in furnaces and for other uses are shown in U.S. Pat. Nos. 1,783,190 (Hertel); 970,660 (Stineman); 4,009,667 (Tyer et al); and 3,976,423 (Schmidt).

The above devices although showing means for internal cooling control of furnace shafts and other shafts, are not without problems. For instance, when a shaft is provided within a shaft, it is necessary to provide adequate insulation between the shafts. Otherwise excessively high temperatures can be conducted through the inner support shaft and cause degradation of the same.

Also, due to the high temperature differential between the outer shaft, which is exposed to the furnace chamber, and the internally cooled shaft, there is a need for a relatively non-heat conducting means to cooperate with each of the shafts to maintain the proper radial spacing of the outer shaft relative to the inner shaft and to provide support for the outer shaft.

Further, due to the high temperature operation of calcining furnaces and the length of the screw shafts, there is needed a means for distributing the bending stress exerted on the shafts in such a manner that the stress will be minimized on those portions of the outer screw flight shaft and inner (internally cooled) shaft which extend into the high temperature reaction zone of the calciner.

These and other problems inherent in the prior art devices are solved by the device disclosed herein, preferred embodiments of which will be further explained in conjunction with the following detailed description and appended drawings.

BRIEF DESCRIPTION OF THE DRAWINGS

In the drawings:

FIG. 2 is a longitudinal sectional view of a screw conveyor in accordance with the invention with certain parts being broken away for better clarity;

FIG. 5 is a bending stress diagram illustrating the bending loads exerted along the length of the outer, screw flight shaft of the screw conveyor; and FIG. 6 is a bending stress diagram illustrating the bending loads exerted along the length of the inner, support shaft of the screw conveyor.

DETAILED DESCRIPTION OF A PREFERRED EMBODIMENT

Specific terms will be used hereinafter in the detailed description for the purposes of describing the invention. However, the use of such specific terms should in no way limit the scope of the invention, which scope is defined in the appended claims.

Figure 1:
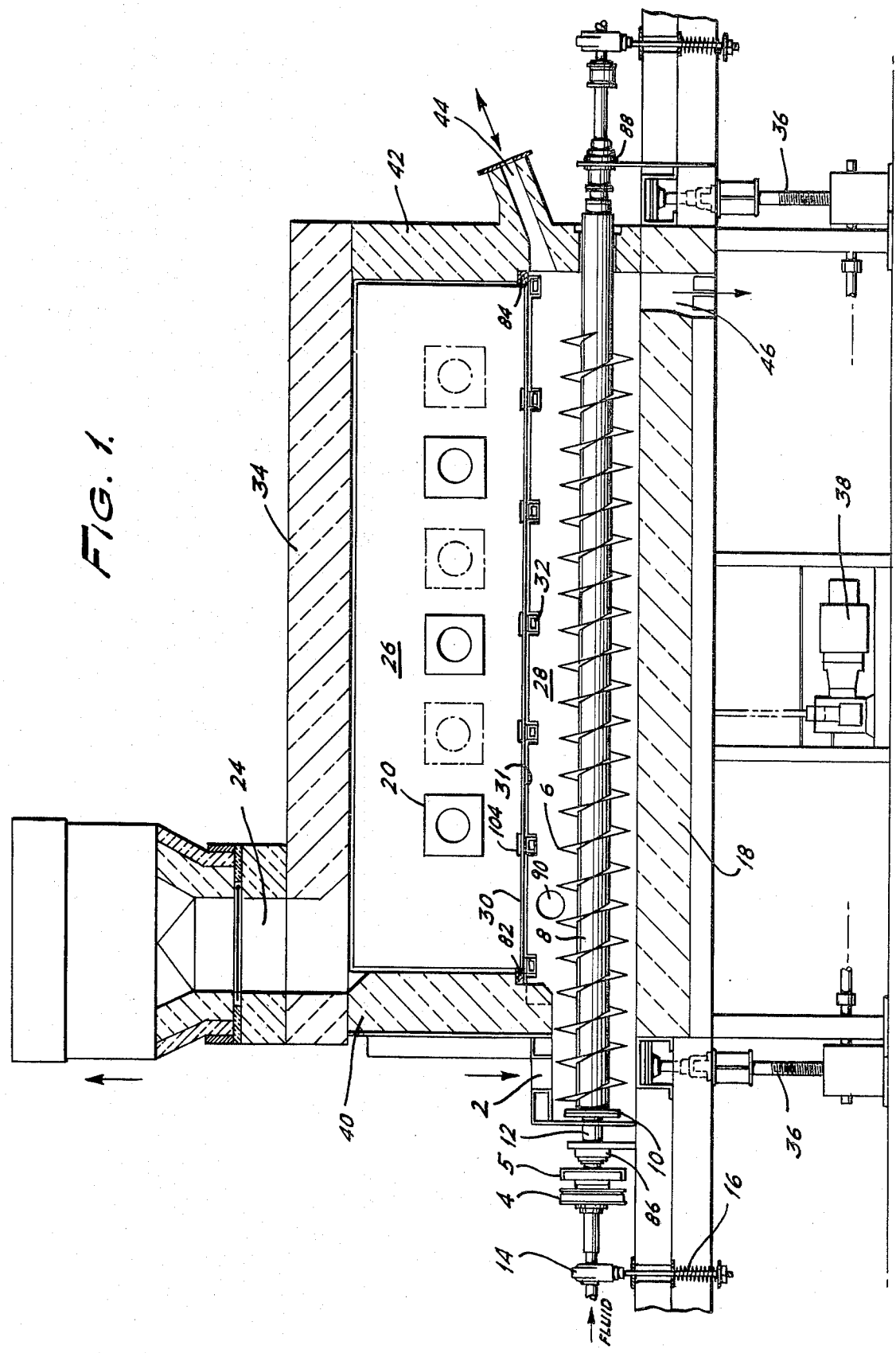
FIG. 1 is a longitudinal sectional view of a calciner in accordance with the invention.

With reference to FIG. 1 of the drawings, there is shown in longitudinal section view, a calciner in accordance with the invention. The calciner comprises feed port 2 into which the material to be calcined is admitted. The calciner is divided into heating chamber 26 and reaction chamber 28 by means of a muffle 30. Horizontal beams 32 and longitudinally extending ledges 31 secure the muffle 30 in the calciner. Ledges 31 are keyed into furnace sidewalls 40, 42 and the horizontal beams 32 are mounted within notches in the ledges 31 and span the calciner. Ends of the beams 32 are anchored in opposed sidewall members. Ceramic seals 82, 84 are provided along the walls 40,42. Although muffle 30 is herein shown and described as partitioning the calciner into a heating zone and a reaction zone, it is noted that the inventive features herein disclosed may be utilized regardless of whether such a muffle is provided in the calciner.

Heating zone 26 is heated by means of a plurality of fuel burners 20, which burners may be adapted for either oil or gaseous fuel consumption. Flue 24 extending through roof 34 of the calciner provides escape for the waste gases emanating from the burners 20. Reaction zone 28 is heated by radiation from the heating zone 26. In this respect, it is important that the muffles 30, which separate the heating and reaction zones be composed of highly thermally conductive materials. It is to be noted that although fossil fuel burners are shown in the drawings, the inventive features herein described are readily utilized in conjunction with other heating devices such as electrical heating means and the like.

Shaft 8 of the screw conveyor having screw flights 6 is coupled to inner support shaft 12 at flange 10. Drive pulley 4 and its associated drive belt are provided to impart rotation to the shaft 12 and screw flight shaft 8. Although FIG. 1 shows only one such shaft 6, 8, a plurality may be used and a gear 5 is provided to drive an adjacent screw.

Adjacent to the respective ends of inner shaft 12 are provided outboard bearings 14 which are urged by means of a spring 16, in a downward direction. These outboard bearings 14 cooperate with novel support bearings (shown and explained hereinafter) and with the fixed inboard bearings 86, 88 to distribute the bending load on both the inner and outer shafts in such manner that acceptable levels of stress are exerted on the regions of the shafts 8, 12 which extend through the reaction zone 28. This is highly advantageous in light of the fact that the calciner is to be ideally operated at temperatures in the excess of 2,000° F., wherein excessive stress on the shafts could lead to serious degradation thereof.

Calciner hearth 18 is mounted on screw jacks 36 or like means which are reciprocated by motor 38 and associated linkage members. In this manner, the hearth 18 may be lowered for cleaning purposes and then raised for operation.

Exit port 46 is provided along the hearth 18 for discharge of the calcined matter after it has been transported through the calciner by the screw flights 6. Exit gas port 44 is provided for discharge of the calcining reaction gas, which gas in most cases may comprise either carbon dioxide, water vapor or sulphur dioxide or mixtures thereof. Port 90 is provided in one of the longitudinally extending sidewalls and may be used for introduction of sweep air. Of course, the positioning of the ports 44, 90 may be reversed.

In practice, multiple pairs of screw assemblies are provided in the calciner. Preferably the flight pitch of one screw in the pair is opposite from that of the other screw in the pair and the screw flights of each respective screw intermesh with those of the other screw in the pair so that the desired material to be calcined is advanced through the calciner when the screws are rotated in opposite directions.

In accordance with the invention, an electronic counter is preferably connected to a hydraulic screw reversing drive to selectively advance and then reverse the path of the material in the calciner so as to increase the residence time of the material therein to expose fresh particle surfaces for calcining. The overall sequence results in advancement of the material to the exit port 46.

At the left-hand side of FIG. 1, there is shown a cooling fluid entry means by which cooling fluid is pumped through the inner shaft 12. Cooled air is pumped through the inner shaft 12.

Accordingly, it will be appreciated that by cooling the inner (support) shaft 12, and by provision of insulation 58,70 (FIG. 2) which is provided along the inner shaft-outer shaft interface, the structural integrity of the screw assembly is vastly improved and is able to withstand high calcining operation temperatures on the order of 2,000° F. or higher on the outer screw shaft. It is pointed out, of course, that, in accordance with the invention, the screw conveyor can also be utilized in environments wherein the temperature is considerably less than 2,000° F.

With reference now to FIG. 2, there is shown a partially cutaway longitudinal sectional view of a preferred embodiment of screw conveyor in accordance with the invention. Here, inner support shaft 12 is coupled to outer shaft 8 at flange 10. Flange 50 is integral with the inner shaft 12 and aids in support and location of the inner shaft 12 within outer shaft 8.

To the right of stub shaft portion 52 of inner shaft 12 is provided a retainer ring 54 and core buster rod 56 which is supported by the ring 54 and which extends axially through the inner shaft 12. Restrictor 92 is supported by a spider 94 mounted on the corebuster rod 56 and increases the velocity of the cooling fluid pumped through the stub shaft 52 to enhance cooling of the inner shaft 12. It is to be noted that a restrictor is provided within the inner shaft at each location of a bearing sleeve 62 and associated parts. Insulation 58 is packed around the inner shaft 12 and extends axially along the inner shaft-outer shaft interface. This provides thermal insulation for the inner shaft 12 since the surface of the outer shaft 8 is exposed to the high temperature of the calcining operation.

A plurality of bearing cages 60 are spaced axially along the length of the inner shaft 12. These cages 60 surround bearing sleeves 62 (FIG. 3) which sleeves are welded to the inner shaft at preselected locations therealong. The cages 60 are provided with a plurality of axially extending slots 64, which slots 64 are completely cut through the cage. These slots provide a raceway into which the ceramic bearing inserts 68 (shown clearly in FIG. 3) are tracked. As shown in FIG. 2, the area surrounding the bearing cages 60 is provided with fibrous insulated packing 70 to insure low heat transfer from the outer shaft 8 through the cage 60 and sleeve 66 to the inner shaft. Set screw 76 is provided at the right side of outer shaft 8 to support the end of outer shaft 8.

Figure 3:
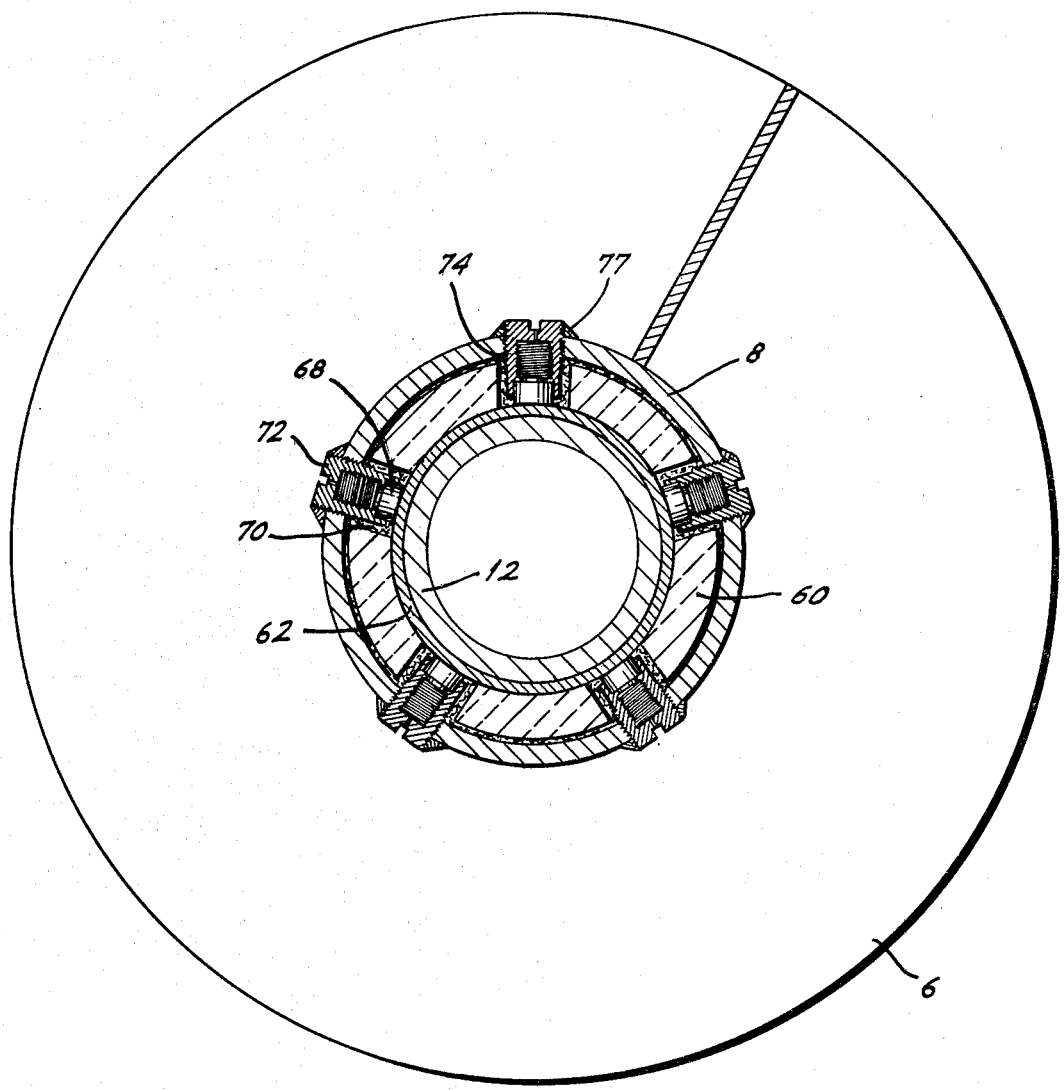
FIG. 3 is a transverse cross sectional view of the screw conveyor shown in FIG. 2, taken along the lines and arrows 3—3 of FIG. 2.
Figure 4:
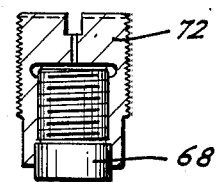
FIG. 4 is a longitudinal sectional view of a support bearing in accordance with the invention.

With attention now being drawn to FIG. 3, it will be seen that inner shaft 12 is adjustably spaced from the outer shaft 8 by means of bearing plug 72 and threaded ceramic insert bearing 68 (also see FIG. 4) which is threaded to the plug 72. The bottom portion of the ceramic insert bearing rests upon the bearing sleeve 62. The bearing plug 72 extends through the axial slot in the bearing cage 60 and through radial tap hole 74 formed in the outer shaft 8. After assembly, and when the desired alignment between the inner and outer shaft has been achieved by adjustment of the bearing plug 72 and the ceramic bearing insert 68, the top portion of the plug is welded, as shown at 77, to the outer shaft 8. It is preferred that five of these bearing plug 72-bearing insert 68 members be provided about the periphery of the inner shaft 12 for each bearing cage and bearing sleeve location along the length of the screw. In this manner, the outer shaft is supported by the plugs 72 and bearing inserts 68 in a novel manner. At the same time, axial expansion or contraction of one of the shafts relative to the other is provided due to the axially formed slots in the bearing cage. Thus, the bearing insert may be moved in the axial direction along the slots to accommodate axial expansion of one of the shafts relative to the other. Further, the provision of a ceramic bearing insert 68 aids in the prevention of heat transfer from the outside of shaft 8 through the plug 72 and into the inner shaft 12. Fibrous insulating packing 70 is provided around the cage 60 to inhibit heat transfer. It will accordingly be appreciated that the bearing plugs 72 provide support for the portions of the outer shaft 8 which extend into the reaction zone 28. This is an important feature of the invention since it, in conjunction with the other bearings, minimizes the bending stress on the screw conveyor in the reaction zone area, thus allowing the calciner to be operated at temperatures in excess of 2,000° F. without causing degradation of the inner or outer shafts.

FIG. 5 shows a bending stress diagram at operating temperatures for the outer screw flight shaft 8 as plotted along the length of the shaft 8. Hash marks 78a, b represent the stress exerted at ends of the shaft 8, at the flange 10 and set screw 76 locations. Marks 80a, b represent the stress exerted at the bearing plug-bearing insert locations. Here, it can be seen that relatively low bending stress is exerted on the outer shaft 8 in the mid-portion of the shaft 8. The horizontally extending line 81 represents a zero stress and bending moment.

FIG. 6 shows a typical bending stress diagram at operating temperatures for the inner support shaft 12. Hash marks 96a, b of this Figure represent the stress exerted on the shaft 12 at the outboard bearing 16 locations. Hash marks 98a, b represent the stress exerted at the inboard bearings 86, 88. Marks 100a, b show the stress exerted on the inner shaft 12 at the bearing plug-ceramic insert bearing locations. Here again, it can be seen that relatively low stress is exerted along the inner support shaft at the mid-length portions on the shaft.

It will be appreciated, accordingly, that this invention provides a screw for a calciner which embodies a shaft within a shaft, with insulation therebetween, the inner shaft being provided with a plurality of spaced apart ceramic insert bearings which maintain accurate spacing between the inner and outer shafts while still permitting longitudinal expansion of one with respect to the other. This is an important and advantageous feature of the invention, particularly when one considers the extremely high temperature that is attainable within the calciner chamber, as contrasted sharply with the temperature of the cooling air or other medium which is conducted longitudinally through the bore of the inner shaft. Because of the efficiency of the insulation which is provided between the inner and outer shafts, heat losses are held to a minimum.

In conjunction with the matter of insulation and prevention of heat loss, it is highly advantageous in accordance with this invention to provide the noval bearing plugs and bearing inserts which extend between the outer shaft and the inner shaft. These bearing plugs not only support and locate the shafts relative to each other but also provide a ceramic insert bearing made of aluminum oxide or the like, which insert bearing has low heat conductivity and which significantly inhibits the flow of heat from the calcining chamber to the cooling air.

Of further importance in connection with the matter of heat conservation is the provision of the bearing cages heretofore referred to. Although portions of the bearings comprise metal of relatively high heat conductivity, the bearing cages surround the bearing themselves, permit utilization of the aforementioned ceramic insert bearings, and insulate the bearings in the manner of an insulating housing. This significantly reduces heat flow from the calcining chamber to the cooling air.

Although the novel shaft in accordance with this invention may be used individually, and rotated either continuously or discontinuously or with oscillation, it is preferred that multiple screws be provided in mated pairs, the screws in each pair intermeshing with each other, and rotating in opposite directions. When utilized in this manner, the particulate material contained in the calcining chamber is continuously moved in a manner to present fresh surfaces for efficient performance of the calcining operation. In a particular preferred embodiment, the screws are driven in an oscillating manner, with the number of rotations in a forward direction being greater than the number of revolutions in the reverse direction. This provides for continuous particle movement while also providing the capability of treating the particulate material for a very extended period within the calcining zone, thus providing for a substantially completely calcined product containing substantially no material which has escaped the calcining reaction. In accordance with this invention, a counter, preferably controlled electronically as by a computer or the like, may be utilized to provide precisely the desired number of forward rotations, in the desired sequence.

Those skilled in the art will be able to fashion equivalent members and means for the various structural members herein disclosed. For instance, those skilled in the art will be able to device other insulated bearings to accurately control the stress alignment between the inner and outer shafts. Further, other means may be devised which allow for the axial expansion or contraction of one of the shafts relative to the other. All such equivalent means and members are intended to be covered by the scope of the appended claims.

I claim:

1. In a calciner of the type wherein a screw type conveyor is provided to advance the work to and through a calcining chamber, and wherein said screw conveyor comprises an outer flight shaft and an internally cooled support shaft which is mounted within said outer flight shaft, the improvement comprising a plurality of bearing means mounted for distributing a bending stress forming on said inner and outer shafts, and means for allowing axial movement of one of said shafts in relation to said other shaft to compensate for linear expansion or contraction of one of said shafts relative to the other.

2. Calciner as defined in claim 1, wherein said means for allowing axial movement of one of said shafts in relation to said other shaft to compensate for linear expansion or contraction of one of said shafts relative to the other shaft comprises a slot.

3. Calciner as defined in claim 1, wherein said means for permitting axial displacement of one of said shafts relative to said other shaft comprises a bearing cage surrounding said inner shaft, said bearing cage including at least one axially extending slot therethrough, said calciner further including a bearing member which extends through said axially extending slot and connects said inner and outer shafts, whereby said bearing member may axially slide in said slot to permit said axial movement of one of said shafts relative to the other shaft.

4. Calciner as defined in claim 3, wherein said bearing member includes a ceramic bearing insert member, said bearing insert member bearing against said inner shaft.

5. Calciner as defined in claim 1, further including a bearing sleeve surrounding said inner shaft, said bearing cage being disposed over said bearing sleeve, and wherein one end of said bearing member bears against said bearing sleeve and the other end of said bearing member is received in said outer shaft.

6. In a calciner of the type wherein a screw type conveyor is provided to advance material to and through a calcining chamber, said calciner including a screw conveyor comprising an outer screw flight shaft and an inner, internally cooled support shaft mounted within said outer shaft, the improvement comprising a plurality of bearing members extending between the respective outer and inner shafts, and outboard bearing means mounted at the ends of said support shaft, said bearing members maintaining the spacing between said inner and outer shafts and cooperating with said outboard bearing means for minimizing bending stresses which result from temperatures differentials between the respective shafts and along their lengths.

7. Calciner as defined in claim 6, further including means for allowing axial movement of one of said shafts in relation to said other shaft to compensate for linear expansion or contraction.

8. Calciner as defined in claim 7, wherein said outboard bearing means is connected to said inner shaft.

9. Calciner as defined in claim 6, wherein said inner shaft is hollow and wherein a fluid is pumped therethrough to cool said inner shaft.

10. Calciner as defined in claim 9, further comprising a fluid restrictor disposed within said inner shaft to increase the velocity of said fluid flowing through said inner shaft.

11. Calciner as defined in claims 9 or 10, wherein said fluid comprises air.

12. Calciner as defined in claim 6, wherein said bearing member includes a ceramic portion adapted to inhibit substantial heat transfer through said bearing member.

13. Calciner as defined in claim 12, wherein a plurality of individual bearing members are disposed in a common plane and are spaced equidistantly from each other to form a set of bearing members which are disposed about the inner shaft.

14. Calciner as defined in claim 13, wherein a plurality of bearing members are provided in sets along the length of said inner and outer shafts.

15. Calciner as defined in claim 14, wherein one or more bearing member sets are provided along the length of said inner and outer shafts.

16. Calciner as defined in claim 6, further including a bearing sleeve surrounding said inner shaft and wherein one end of said bearing members bears against said bearing sleeve.

17. Calciner as defined in claim 15, further including a bore formed in said outer shaft, and wherein the other end of said bearing member is received in said bore.

18. Calciner as defined in claim 16, wherein said means for allowing axial movement of one of said shafts in relation to said other shaft comprises a bearing cage surrounding said bearing sleeve, said cage having at least one axially extending slot therein, a portion of said bearing member being receiving in said axial slot for permitting said axial movement of one of said shafts relative to said other shaft.

19. Calciner as defined in claim 13, wherein three or more individual bearing members are disposed in a common plane to form a set.

20. Calciner as defined in claim 8, wherein said outboard bearing means are biased downwardly.

21. Calciner as defined in claim 20 including spring means which pull on said outboard bearing means to exert said downward biasing.

* * * * *